(12) United States Patent
Neidig et al.

(10) Patent No.: US 6,577,241 B2
(45) Date of Patent: Jun. 10, 2003

(54) METHOD FOR CENTRALIZED ANIMAL IDENTIFICATION AND TRACKING

(76) Inventors: Van H. Neidig, 83862 547th Ave., Battle Creek, NE (US) 68715; Kathleen M. Neidig, 83862 547th Ave., Battle Creek, NE (US) 68715

(*) Notice: Subject to any disclaimer, the term of this patent is extended or adjusted under 35 U.S.C. 154(b) by 0 days.

(21) Appl. No.: 09/962,281

(22) Filed: Sep. 25, 2001

(65) Prior Publication Data

US 2003/0058113 A1 Mar. 27, 2003

(51) Int. Cl.$^7$ ................................................ G08B 23/00

(52) U.S. Cl. .......................... 340/573.3; 340/573.1; 119/51.02

(58) Field of Search ............................. 340/568.6, 568.7, 340/572.1, 573.1, 573.3, 573.4; 119/51.02, 842, 858, 655; 600/551

(56) References Cited

U.S. PATENT DOCUMENTS

| | | | | |
|---|---|---|---|---|
| 4,455,610 A | * | 6/1984 | Rodrian | 600/551 |
| 4,718,374 A | * | 1/1988 | Hayes | 119/655 |
| 6,000,361 A | * | 12/1999 | Pratt | 119/51.02 |

* cited by examiner

Primary Examiner—Van Trieu

(57) ABSTRACT

A method for identifying and tracking a plurality of individual animals includes the initial step of a manufacturer creating a plurality of EIDs, each EID having a unique number. A livestock producer requests a plurality of EIDs from the manufacturer, and the manufacturer forwards the numbers of the EIDs shipped to the producer, along with identification data for that producer, to a central warehouse. The warehouse creates a prerecord in a central database from the EID number and identification data for the producer, and communicates with the producer to permit access to the prerecords for that producer. The producer will collect data relative to each animal and input the data into a computer having the downloaded prerecords from the central data warehouse.

4 Claims, 4 Drawing Sheets

METHOD FOR CENTRALIZED ANIMAL IDENTIFICATION AND TRACKING

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to animal identification systems, and more particularly to an improved centralized identification system and method for tracking livestock and the like.

(2) Background Information

Hot iron branding, freeze branding, tattooing, and ear tagging are just a few identification methods currently in use in the world today to identify and track livestock. Recently, electronic identification (EID) has begun to play an increasing role in animal identification.

Currently, EID devices are produced in large quantities by manufacturers and drop shipped directly to an end user, as needed. Each animal is then permanently identified with the EID device by implanting or attaching a single device on each animal. Each end user (conventionally a livestock producer) must then "read" from each device on each animal using some form of radio frequency identification (RFID) scanner.

Once an animal has received an EID, data may be collected relative to each animal. Currently, several methods for this data collection are being used. The most basic method is the use of paper to write down a hard copy of the EID and specific data relative to the animal. The problem with the paper method, and using EIDs, is the fact that an EID number is typically 12 to 20 digits in length. Thus, the producer must activate the RFID scanner to read the EID number, which is displayed on the scanner, and then copy the number on to a piece of paper before entering the various data relative to the animal. The process of copying 12 to 20 digit numbers for a herd of livestock quickly becomes tedious and prone to errors.

A second method of data collection is entering the data into a computer on a spreadsheet or other computerized data management system. This permits the producer to sort the data and use it meaningfully to perform analysis and generate reports.

A third method of data collection includes forwarding the handwritten records to a central location where a person other than the producer enters the data into a computer. The producer would then usually have some type of access to the data at the central location. This data access would typically consist of printed reports or other analysis generated by the entity of the central location, and may be sent by standard mail or electronic mail to the producer.

The main difficulty with all three of the above methods is the fact that the same data must be entered multiple times, either by hand or by entering on to a computer. This becomes time consuming and monotonous, especially if the number of animals being identified and tracked is large. In order to overcome these problems, there are two methods of electronic data collection currently available to producers to avoid the need for multiple enter of the EID and accompanying data.

The first method of electronic data collection utilizes an RFID scanner which is tethered to a lap top computer or the like with a serial cable. In this way, the EID numbers are scanned and directly transmitted electronically to the computer. However, this requires a computer which is set up in proximity to where the animals are located. Originally, this would require that the computer be set up outdoors, which can pose many difficulties in adverse weather conditions.

Finally, a producer could utilize a hand held, or otherwise portable computer, tethered to an RFID scanner (or having such a scanner built directly into the computer). Such a portable computer must also be rigid and durable enough to withstand the adverse weather conditions at the location of the animals. Few such devices of this type are currently available.

BRIEF SUMMARY OF THE INVENTION

It is therefore a general object of the present invention to provide an improved method for identification and tracking of animals.

Another object of the present invention is to provide an identification and tracking system which eliminates the need for multiple entry of data related to an animal.

Yet a further object is to provide an identification and tracking method which eliminates the need for scanning an EID on an animal.

These and other objects of the present invention will be apparent to those skilled in the art.

The method for identifying and tracking a plurality of individual animals of the present invention includes the initial step of a manufacturer creating a plurality of EIDs, each EID having a unique number. A livestock producer requests a plurality of EIDs from the manufacturer, and the manufacturer forwards the numbers of the EIDs shipped to the producer, along with identification data for that producer, to a central warehouse. The warehouse creates a prerecord in a central database from the EID number and identification data for the producer, and communicates with the producer to permit access to the prerecords for that producer. The producer will collect data relative to each animal and input the data into a computer having the downloaded prerecords from the central data warehouse.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
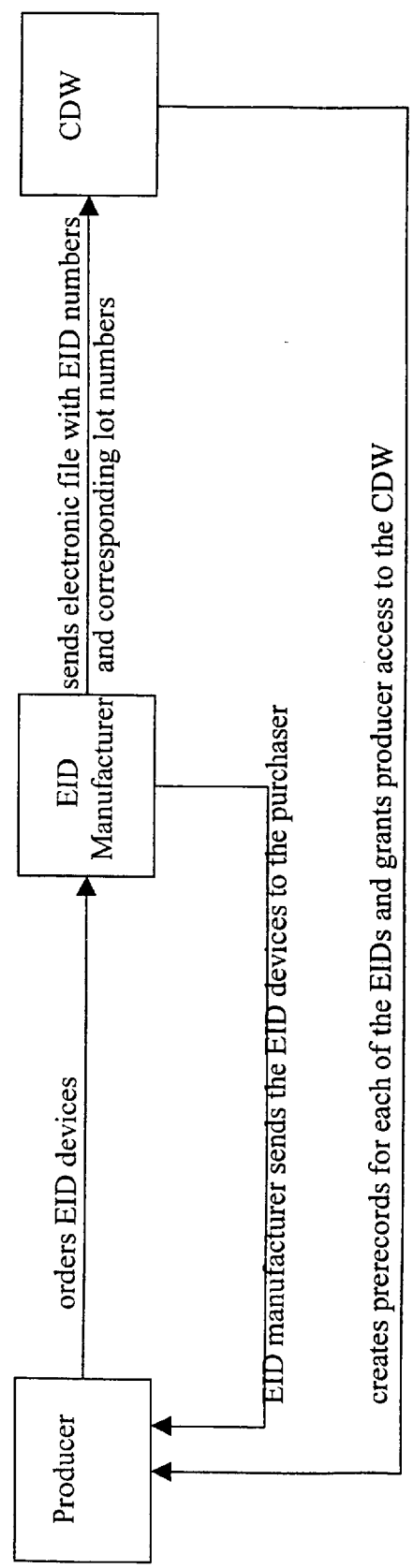
FIG. 1 is a flowchart of the method for creating prerecords.

Referring now the drawings, and more particularly to FIG. 1, the greatest advantage of the animal identification and tracking method of the present invention is the elimination of the need of the end user to scan an animal's EID. This is accomplished by the creation of what the inventors have termed "prerecorded". A prerecord is simply a data file which is created in association with each electronic identification device (EID) which is manufactured. An end user (producer), would order a number of EIDs from an EID manufacturer, for the producer's livestock. The EID manufacturer would then do two things: (1) It would manufacture and ship the desired number of EIDs to the producer, and (2) send a data file regarding each EID to a central data warehouse. The data file for each EID would include the EID scanned number, and the name and address of the purchaser of the EID.

As a part of the International Standards Organization (ISO) 11784 and 11785 Standards, EID manufacturers are required to individually track every EID that they sell and distribute. Thus, the data file for each EID includes all information required by these ISO standards, and would necessarily be collected and recorded by the EID manufacturer. The method of this invention takes the additional step of transmitting this information to a centralized data warehouse as a prerecord. The centralized data warehouse (CDW) would then contact the producer and arrange for access to the central data base of the CDW. Such access is currently envisioned via the Internet. Typically, the CDW would be run by a business which would contact each owner and create specific owner identification numbers and passwords for safe and secure access between each purchaser and the purchaser's prerecords in the data base. Upon initiation, each prerecord is an actual record in the CDW which contains the owner's identification number and the EID number. This prerecord may be reviewed and downloaded to the purchaser's computer for use in collecting data from the producer's livestock. A flowchart showing the creation of prerecords is shown in FIG. 1.

There are three methods envisioned by the inventors for collecting data relative to the livestock and storing and processing that data at the CDW. The first method, utilizing a handheld computer is represented by the flowchart of FIG. 2.

Figure 2:
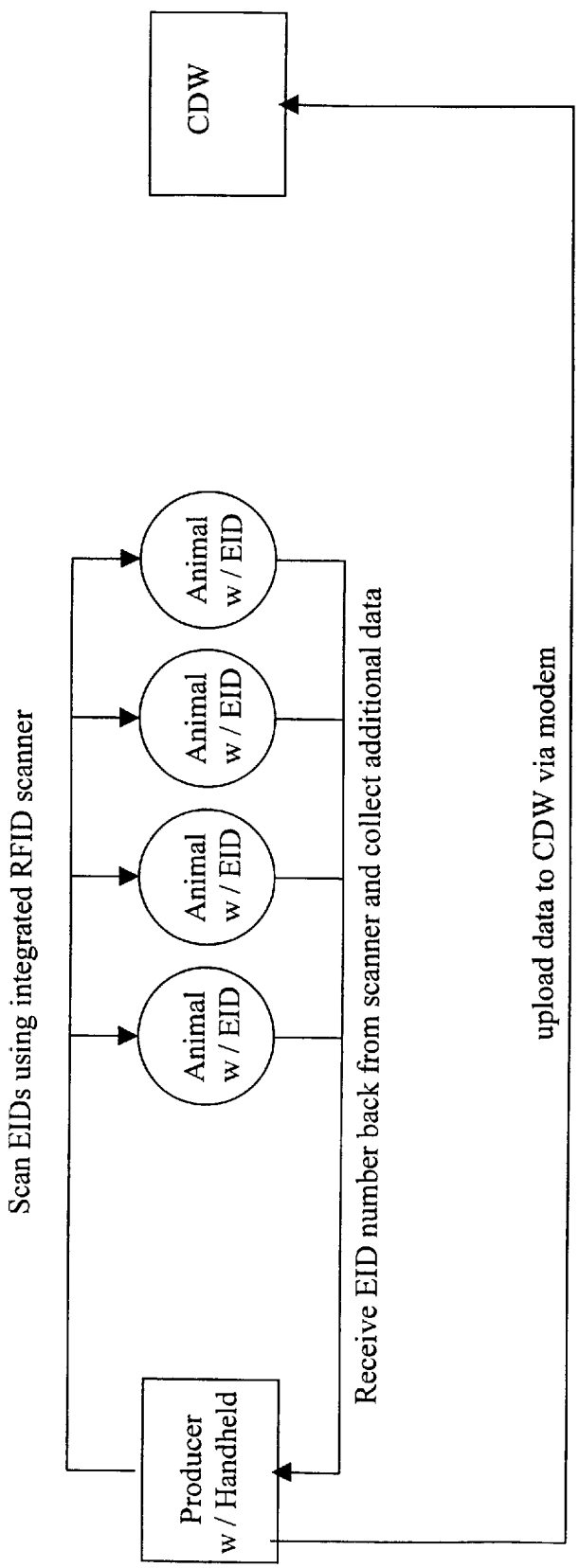
FIG. 2 is a flowchart showing the method for collecting data using a handheld computer.

FIG. 2 shows both the prior art method for collecting data and an embodiment of the method of the present invention which utilizes records stored at the CDW. In the prior art method, a producer with a handheld computer scans the EID on an animal to determine the EID number. The EID number is then entered into the handheld computer and any information relating to that animal is also entered. The producer then moves to the next animal and continues the same scanning, inputting EID number, and inputting data for each animal in the herd.

In the method of the present invention, the handheld computer unit includes an electronically integrated RFID scanner. The scanner is utilized to read the EID numbers, the same as in prior art methods. The handheld unit also includes software for entering data to be collected from each animal. This software may include predefined drop down lists of data to be collected, such as breed or medical treatments, or providing space for entering data, such as visual ID (ear tag) numbers or herd-identification numbers. Finally, the software includes the capability of uploading collected data on each EID to the CDW utilizing a modem on the handheld unit. The up load of data to the CDW permits processing of data at the CDW for utilization by the producer.

The two preferred methods of the present invention call for the creation of prerecords upon the production and shipment of EID devices to a producer, so that the producer may utilize the prerecords in collecting data, rather than having to scan the EID each time data is collected.

The first method for collecting data utilizes a personal digital assistant (PDA) as a data collection device. The PDA would be preloaded with data collection software, the prerecords from the data base at CDW, as well as software for communicating with the CDW. To collect data the producer would simply look at the EID device on the animal to determine the last few digits of the EID number (which are printed on the exterior surface of the EID device), and then select the appropriate EID from a drop down box on the display screen of the PDA. The remainder of the data collection would proceed as on a handheld computer unit with the producer selecting options from drop down lists and hand ready entries where necessary.

Once the data has been collected, it is uploaded directly to the CDW via a modem attachment for the PDA. The use of two-way communications over the phone line enables the CDW and PDA to perform a live synchronization, whereby each of them is updated with the most recent information collected on the PDA.

Figure 3:
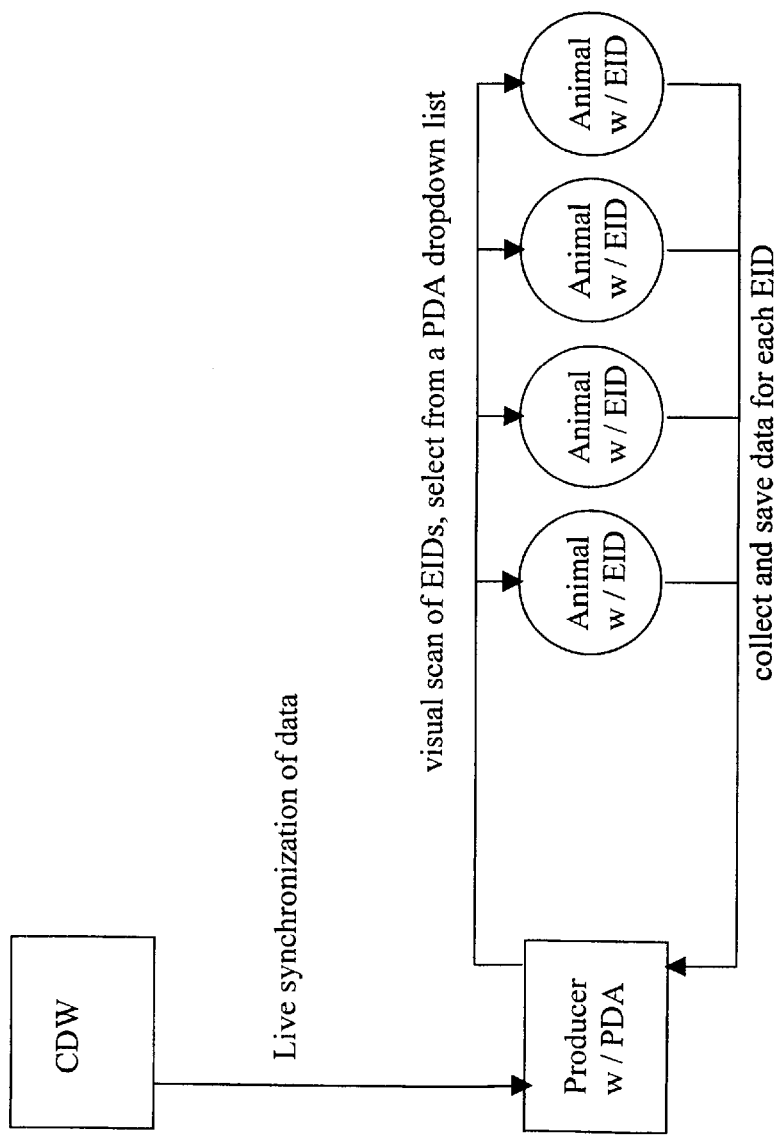
FIG. 3 is a flowchart showing the method for collecting data using a personal digital assistant.
Figure 4:
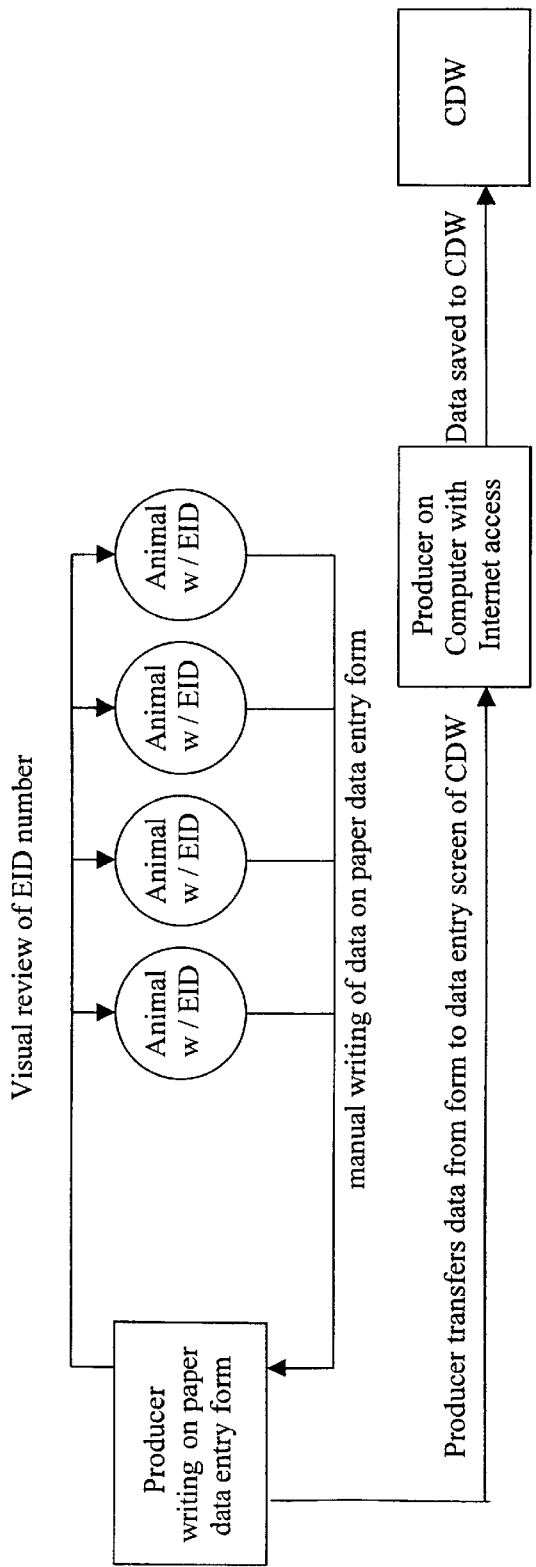
FIG. 4 is a flowchart showing the method for collecting data using on-line data entry.

Another data collection method is shown in FIG. 4. This method is similar to the methodology described in FIG. 3 with respect to PDAs, in that it relies on the existence of prerecords. The producer first visually notes the EID number from an animal and selects it from a drop down list on a web page accessible from the producer's computer and connected to the CDW web site. Once the appropriate EID is selected, data entry occurs by selecting and typing with a mouse and/or keyboard. Unless the computer is portable or located immediately adjacent the livestock, it is necessary for the producer to write down data on paper while working with the livestock, and then take the paper with the data to the computer to enter the information online.

Once step of the data collection process of the present invention which makes the method much less tedious and time consuming is the association or cross referencing of an animal's EID number with its existing visual identification number, usually found on a conventional ear tag. Once this association has been made, the producer is never required to refer to the EID of the animal again. Rather, the producer may simply utilize the visual identification number, which is usually much shorter and easier to remember than the EID number, in order to reference a particular animal. In this way, the producer need never again scan the EID of a particular animal.

As can be seen in considering the method of the present invention, the identification and tracking system of the present invention is based upon EID numbers of individual animals. Each EID number for any animal is unique, worldwide. Because of this uniqueness, the EID number is used as the "key" and primary index in the data base of the CDW. No records can be created in the CDW without a valid EID. Further, none of the methods of data collection allow for manual entry of an EID into the CDW. All EID numbers in the CDW must be obtained electronically, either by scanning directly into the data entry system with an RFID scanner, or by virtue of a prerecord established when the manufacturer contacts the CDW.

Whereas the invention has been shown and described in connection with the preferred embodiment thereof, many modifications, substitutions and additions may be made which are within the intended broad scope of the appended claims.

We claim:

1. A method for identifying and tracking a plurality of individual animals, comprising the steps of:

a manufacturer creating a plurality of EIDs, each EID having a unique number in a universe consisting of all EIDS created by the manufacturer;

at the request of a producer, the manufacturer sending a first plurality of EIDs to the producer for attachment to animals to be identified and tracked, said first plurality of EIDs including visual IDs including a number unique among the first plurality of EIDs, while substantially simultaneously forwarding the numbers of the first plurality of EIDs along with identification data for the producer to whom the first plurality was shipped, to a central data warehouse remote from producers' sites;

the central data warehouse including a database, a processor, and means for communication with producers, said warehouse processor creating and showing individual prerecords in the database, each prerecord including an individual EID number, a visual ID number and producer identification data to whom the EID was shipped;

said warehouse processor programmed to prevent the creation of any EID prerecords by a producer;

the producer attaching the first plurality of EIDs to a first plurality of animals to be identified and tracked, with one EID per animal; and the producer communicating with the warehouse database and downloading prerecords established for EIDs shipped to the producer from the warehouse database to a producer's computer located at the producer's site.

2. The method of claim 1, further comprising the steps of:

the producer collecting data relative to each animal and inputting the data with respect to each EID number into the producer's downloaded prerecords; and the producer accessing the prerecords at the central data warehouse and transmitting the collected data to the warehouse for updating and storage in a data file relative to each EID prerecord.

3. The method of claim 2, wherein the step of collecting data includes the steps of:

the producer's computer including software permitting the producer to view a list of all downloaded prerecords and to select individual prerecords for data additions, and preventing the producer from creating any prerecords;

the producer viewing the list and selecting a desired EID; and the producer entering data into the computer relative to the EID, after viewing the animal associated with the selected EID.

4. The method of claim 2, wherein the step of collecting data includes the steps of:

the producer's computer including software permitting the producer to view a list of all downloaded prerecords along with the visual IDs assigned to each prerecord and to select individual prerecords for data additions;

the producer's computer including software preventing the producer from creating any prerecords;

the producer viewing the list and selecting a desired EID and associated visual ID; and the producer viewing the visual ID of an animal being tracked and entering data into the computer prerecord relative to the visual ID.

* * * * *